(12) United States Patent
Bouazizi et al.

(10) Patent No.: US 10,958,890 B2
(45) Date of Patent: Mar. 23, 2021

(54) METHOD AND APPARATUS FOR RENDERING TIMED TEXT AND GRAPHICS IN VIRTUAL REALITY VIDEO

(71) Applicant: Samsung Electronics Co., Ltd., Suwon-si (KR)

(72) Inventors: Imed Bouazizi, Frisco, TX (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 15/927,942

(22) Filed: Mar. 21, 2018

(65) Prior Publication Data
US 2018/0288396 A1  Oct. 4, 2018

Related U.S. Application Data

(60) Provisional application No. 62/479,418, filed on Mar. 31, 2017.

(51) Int. Cl.
*H04N 13/183* (2018.01)
*H04N 13/117* (2018.01)
*H04N 13/167* (2018.01)
*H04N 13/128* (2018.01)

(52) U.S. Cl.
CPC ......... *H04N 13/183* (2018.05); *H04N 13/117* (2018.05); *H04N 13/128* (2018.05); *H04N 13/167* (2018.05)

(58) Field of Classification Search
CPC .. H04N 13/183; H04N 13/128; H04N 13/167; H04N 13/117
See application file for complete search history.

(56) References Cited

U.S. PATENT DOCUMENTS

| | | | |
|---|---|---|---|
| 8,194,117 B2 | 6/2012 | Hetherington et al. |
| 8,566,075 B1 | 10/2013 | Bruner |
| 9,282,377 B2 | 3/2016 | Bruner |
| 9,704,298 B2 | 7/2017 | Espeset et al. |
| 9,709,809 B2 | 7/2017 | Miyawaki et al. |

(Continued)

FOREIGN PATENT DOCUMENTS

| | | |
|---|---|---|
| CN | 105915818 A | 8/2016 |
| EP | 2421276 A2 | 2/2012 |

(Continued)

OTHER PUBLICATIONS

ISA/KR, "International Search Report and Written Opinion of the International Searching Authority," International Application No. PCT/KR2018/003688, Jul. 12, 2018, 7 pages.

(Continued)

*Primary Examiner* — Richard A Hansell, Jr.

(57) ABSTRACT

An electronic device, a server and a method for rendering timed text within an omnidirectional video are disclosed. The method includes receiving a signaling message including a flag indicating whether a position of the timed text within the omnidirectional video is dependent on a viewport of the omnidirectional video. The method also includes determining whether the position of the timed text within the omnidirectional video is dependent on the viewport based on the flag. The method further includes rendering the timed text within the omnidirectional video based on the determination.

20 Claims, 10 Drawing Sheets

(56) References Cited

U.S. PATENT DOCUMENTS

| | | |
|---|---|---|
| 2003/0063133 A1 | 4/2003 | Foote et al. |
| 2009/0273711 A1* | 11/2009 | Chapdelaine .......... G11B 27/34 348/465 |
| 2011/0150421 A1* | 6/2011 | Sasaki .................... H04N 13/10 386/241 |
| 2011/0196749 A1* | 8/2011 | Herlein ................ H04N 21/812 705/14.72 |
| 2011/0211815 A1* | 9/2011 | Yamashita ........... H04N 13/156 386/353 |
| 2011/0310095 A1* | 12/2011 | Tung ..................... G06T 15/503 345/419 |
| 2011/0310224 A1* | 12/2011 | Lee ...................... H04N 7/0885 348/43 |
| 2014/0160163 A1 | 6/2014 | Zhang et al. |
| 2014/0307051 A1* | 10/2014 | Suh ...................... H04N 13/161 348/43 |
| 2016/0004298 A1 | 1/2016 | Mazed et al. |
| 2016/0065929 A1 | 3/2016 | Barcons-Palau et al. |
| 2016/0093105 A1* | 3/2016 | Rimon .................... G06T 11/60 345/633 |
| 2016/0269711 A1* | 9/2016 | Hwang .................. H04N 13/30 |
| 2017/0295363 A1 | 10/2017 | Kikuchi |
| 2018/0240276 A1* | 8/2018 | He ........................ G06T 3/0087 |
| 2018/0332265 A1* | 11/2018 | Hwang ................ H04N 21/816 |
| 2020/0105063 A1* | 4/2020 | Wang ..................... G06F 3/011 |

FOREIGN PATENT DOCUMENTS

| | | |
|---|---|---|
| EP | 3145199 A1 | 3/2017 |
| JP | 6084728 B1 | 2/2017 |
| KR | 10-1606860 B1 | 3/2016 |
| KR | 101606860 B1 * | 3/2016 |

OTHER PUBLICATIONS

European Patent Office, "Supplementary European Search Report," Application No. EP 18778028.3, dated Jan. 3, 2020, 8 pages.

The First Office Action regarding Chinese Patent Application No. 201880022681.8, dated Sep. 11, 2020, 17 pages.

* cited by examiner

METHOD AND APPARATUS FOR RENDERING TIMED TEXT AND GRAPHICS IN VIRTUAL REALITY VIDEO

CROSS-REFERENCE TO RELATED APPLICATION AND CLAIM OF PRIORITY

This application claims priority under 35 U.S.C. § 119(e) to U.S. Provisional Patent Application Ser. No. 62/479,418 filed on Mar. 31, 2017. The above-identified provisional patent application is hereby incorporated by reference in its entirety.

TECHNICAL FIELD

This disclosure relates generally to virtual reality. More specifically, this disclosure relates to rendering timed text and graphics within an omnidirectional virtual reality video.

BACKGROUND

Two-dimensional videos often include timed text. Timed text is commonly called subtitles, closed captions, or open captions. Timed text is often utilized for the hearing impaired as well as a video or show where the dialog is not in the native language of the viewer. Timed text is a presentation of text that is synchronized to display simultaneously with the audio of the video.

Timed text places text in videos without actually embedding the text itself within the video. This allows the timed text to be turned on and off, as well as offers the ability to display different languages while the same underlying video presentation is played.

Virtual reality experiences are becoming prominent. For example, 360° video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene they desire. Display and navigation sensors track head movement in real-time to determine the region of the 360° video that the user wants to view.

SUMMARY

This disclosure provides methods and apparatuses for rendering timed text and graphics in virtual reality video.

In a first embodiment, an electronic device for rendering timed text within an omnidirectional video is provided. The electronic device includes a transceiver. The transceiver is configured to receive a signaling message including a flag indicating whether a position of the timed text within the omnidirectional video is dependent on a viewport of the omnidirectional video. The electronic device also includes a processor operably coupled to the transceiver. The processor is configured to determine whether the position of the timed text within the omnidirectional video is dependent on the viewport based on the flag. The processor is also configured to render the timed text within the omnidirectional video based on the determination.

In a second embodiment a server for supporting timed text within omnidirectional video is provided. The server includes a processor. The processor is configured to generate a signaling message including a flag indicating whether a position of the timed text to be rendered within the omnidirectional video is dependent on a viewport of the omnidirectional video. The server also includes a communication interface operably coupled to the processor. The communication interface is configured to transmit the signaling message to an electronic device to indicate whether the position of the timed text within the omnidirectional video is dependent on the viewport for rendering of the timed text within the omnidirectional video.

In a third embodiment, a method for rendering timed text within omnidirectional video is provided. The method includes receiving a signaling message including a flag indicating whether a position of the timed text within the omnidirectional video is dependent on a viewport of the omnidirectional video. The method also includes determining whether the position of the timed text within the omnidirectional video is dependent on the viewport based on the flag. The method further includes rendering the timed text within the omnidirectional video based on the determination.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
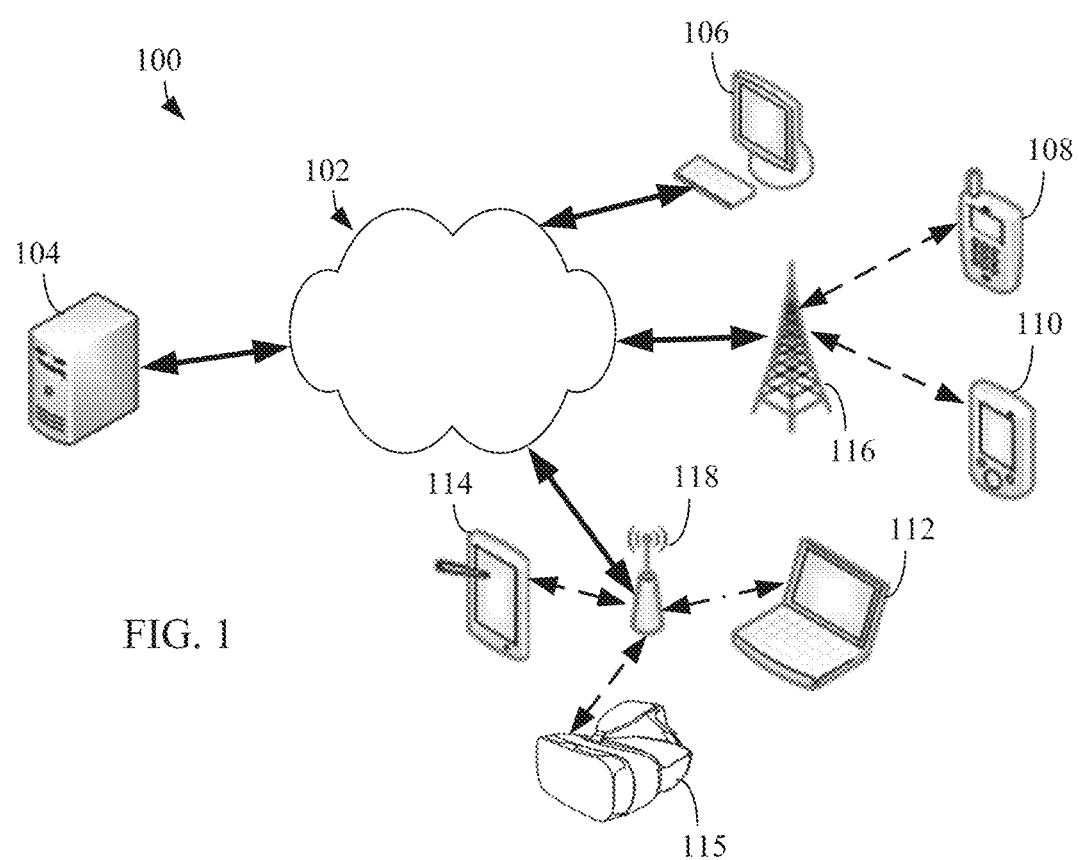
FIG. 1 illustrates an example computing system in accordance with embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Virtual reality (VR) is a rendered version of a visual and audio scene. The rendering is designed to mimic the visual and audio sensory stimuli of the real world as naturally as possible to an observer or user as they move within the limits defined by the application. For example, VR places a user into immersive worlds that interact with their head movements. At the video level, VR is achieved by providing a video experience that covers as much of the field of view (FOV) as possible together with the synchronization of the viewing angle of the rendered video with the head movements. Although many different types of devices are able to provide such an experience, head mounted displays are the most popular. Typically head mounted displays rely either on dedicated screens integrated into the device and running with external computers (tethered) or on a smartphone inserted into the HMD (untethered). The first approach utilizes lightweight screens and benefiting from a high computing capacity. In contrast the smartphone-based systems, utilizes a higher mobility and can be less expensive to produce. In both instances, the video experience is generated the same.

VR content can be represented in different formats, such as panoramas or spheres, depending on the capabilities of the capture systems. Many systems capture spherical videos covering the full 360°×180° view. A 360°×180° view is represented as a complete view of a half sphere. For example, a 360°×180° view is a view of a top half of a sphere where the viewer can view 360° in the horizontal plane and 180° vertical view plane. Capturing content within a 360°×180° view is typically performed by multiple cameras. Various camera configurations can be used for recording two-dimensional and three-dimensional content. The captured views from each camera are stitched together to combine the individual views of the omnidirectional camera systems to a single panorama or sphere. The stitching process typically avoids parallax errors and visible transitions between each of the single views.

Various video coding standards struggle to handle spherical content, as the various coding standards are intended for content to be displayed on a rectangular plane, similar to traditional television and monitor screens. Therefore, in VR systems, projection methods are often used for conversion of a spherical (or 360°) video content into a two-dimensional rectangular video prior to the encoding stage. A commonly used projection method is an equirectangular projection (ERP). During an ERP the horizontal and vertical coordinates simply correspond to longitude and latitude, respectively, with no transformation or scaling applied. After the projection, the obtained two-dimensional rectangular image can be partitioned into regions that can be rearranged to generate "packed" frames.

In order to provide implementation flexibility of timed text in a 360° video, a control mechanism is needed, to indicate where to display the timed text within the 360° video as well as ensuring the text is not distorted. Timed text that is intended for two-dimensional viewing can often be distorted when viewed in a 360° video. According to embodiments of the present disclosure, various methods for providing timed text are illustrated for adapting the display of timed text within a 360° video. The cue box is a region within the video that displays the timed text. The cue box needs to be altered to adjust for depth, distortion if viewed through a stereoscopic display, and the location within the 360° video.

According to embodiments of the present disclosure, the timed text can be displayed relative to the whole video and relative to the current viewport of the user. For example, timed text that is displayed relative to the whole video is the timed text is displayed at one location within the omnidirectional 360° video. That is, in order for the user to view the timed text, the user must look in a specific direction within the omnidirectional 360° VR video. Through navigation sensors, the VR device tracks head movements of the user in real-time to determine the region of the 360° video that the user is currently viewing. In another example, the timed text that is displayed relative to the current viewport of the user is timed text that is always displayed regardless of the direction the user is currently viewing, within the omnidirectional 360° VR video.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-115. The client devices 106-115 may be, for example, a smartphone, a tablet computer, a laptop, a personal computer, a wearable device, or a head-mounted display (HMD). The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102. As described in more detail below, the server 104 transmits the 360° video with timed text to one or more users.

Each client device 106-115 represents any suitable computing or processing device that interacts with at least one server or other computing device(s) over the network 102. In this example, the client devices 106-115 include a desktop computer 106, a mobile telephone or mobile device 108 (such as a smartphone), a personal digital assistant (PDA) 110, a laptop computer 112, a tablet computer 114, and a HMD 115. However, any other or additional client devices could be used in the system 100.

In this example, some client devices 108-115 communicate indirectly with the network 102. For example, the client devices 108 and 110 (mobile devices 108 and PDA 110, respectively) communicate via one or more base stations 116, such as cellular base stations or eNodeBs (eNBs). Mobile device 108 includes smartphones. Smartphones represent a class of mobile devices 108 that are a handheld device with a mobile operating system and an integrated mobile broadband cellular network connection for voice, short message service (SMS), and internet data communication. Also, the client devices 112 and 114 (laptop computer and tablet computer, respectively) communicate via one or more wireless access points 118, such as IEEE 802.11 wireless access points. As described in more detail below the HMD 115 can display a 360° video with timed text to one or more users. Note that these are for illustration only and that each client device 106-115 could communicate directly with the network 102 or indirectly with the network 102 via any suitable intermediate device(s) or network(s).

In certain embodiments, the mobile device 108 (or any other client device 106-115) can transmit information securely and efficiently to another device, such as, for example, the server 104. The mobile device 108 (or any other client device 106-115) can function as a VR display when attached to a headset and function similar to HMD 115. The mobile device 108 (or any other client device 106-115) can trigger the information transmission between itself and server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device or a server to provide timed text to a user while the user views a 360° VR environment. In certain embodiments, client devices 106-115 display the timed text within the VR video in an undistorted manner. For example, the server 104 adapts the timed text to render correctly within the VR video. The server 104 can then transmit the VR video data to client devices 106-115. The client devices 106-115 can overlay and render the timed text onto the VR 360° video, in the location as indicated by the timed text data via server 104.

Figure 2:
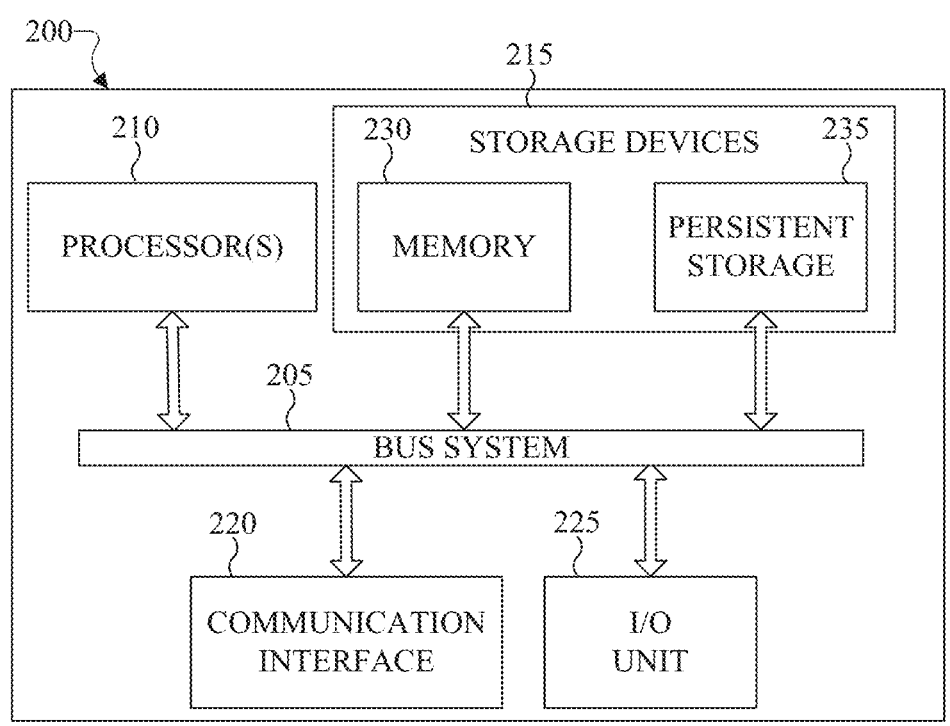
FIG. 2 illustrates an example server in a computing system in accordance with an embodiment of this disclosure.
Figure 3:
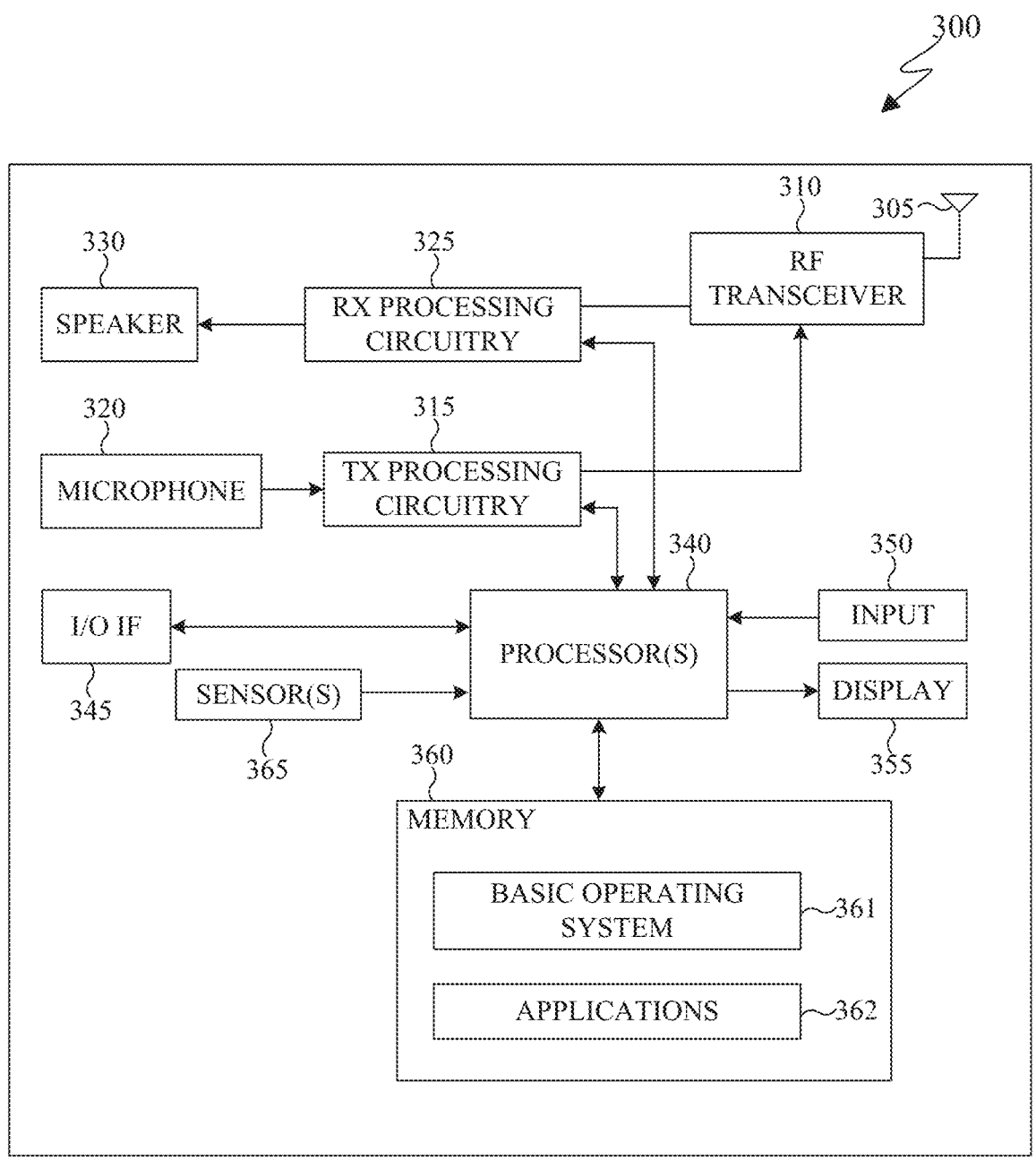
FIG. 3 illustrates an example electronic device in accordance with an embodiment of this disclosure.

FIGS. 2 and 3 illustrate example devices in a computing system in accordance with an embodiment of this disclosure. In particular, FIG. 2 illustrates an example server 200, and FIG. 3 illustrates an example electronic device 300. The server 200 could represent the server 104 of FIG. 1, and the electronic device 300 could represent one or more of the client devices 106-115 of FIG. 1.

Server 200 can represent one or more local servers, one or more omnidirectional video servers, or one or more timed text servers. As shown in FIG. 2, the server 200 includes a bus system 205 that supports communication between at least one processor(s) 210, at least one storage device(s) 215, at least one communications interface 220, and at least one input/output (I/O) unit 225.

The processor 210 executes instructions that can be stored in a memory 230. The instructions stored in memory 230 can include instructions for formatting timed text and the text itself, within an omnidirectional 360° scene, as viewed through a VR headset, such as HMD 115 of FIG. 1. The instructions stored in memory 230 can also include instructions for rendering the timed text on an omnidirectional 360° scene, as viewed through a VR headset, such as HMD 115 of FIG. 1. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, motion sensors, or other suitable input device. The I/O unit 225 can also send output to a display, printer, or other suitable output device.

In certain embodiments, server 200 implements the integration timed text into an omnidirectional 360° media scene, as will be discussed in greater detail below. In certain embodiments, server 200 integrates timed graphics into an omnidirectional 360° media scene, as will be discussed in greater detail below. Timed graphics are similar to timed text where graphics are displayed instead of text within the cue box. For example, server 200 integrates and embeds timed text data and the timed graphic data within the omnidirectional 360° video data in order that when the video data is played and viewed by a user, the text is be viewable in an undistorted manner by the user within the spherical 360° video environment.

Note that while FIG. 2 is described as representing the server 104 of FIG. 1, the same or similar structure could be used in one or more of the various client devices 106-115. For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the client devices 106-115 of FIG. 1 can include the same or similar configuration as electronic device 300.

In certain embodiments, electronic device 300 is useable with data transfer and media playing applications. The electronic device 300 can be a mobile communication device, such as, for example, a wireless terminal, a desktop computer (similar to desktop computer 106 of FIG. 1), a mobile device (similar to mobile device 108 of FIG. 1), a PDA (similar to PDA 110 of FIG. 1), a laptop (similar to laptop computer 112 of FIG. 1), a tablet (similar to tablet computer 114 of FIG. 1), a head mounted display (similar to HMD 115 of FIG. 1), and the like.

As shown in FIG. 3, the electronic device 300 includes an antenna 305, a radio frequency (RF) transceiver 310, a transmit (TX) processing circuitry 315, a microphone 320, and a receive (RX) processing circuitry 325. The electronic device 300 also includes a speaker 330, a one or more processors 340, an input/output (I/O) interface (IF) 345, an input 350, a display 355, and a memory 360. The memory 360 includes a basic operating system (OS) 361 and one or more applications 362.

The RF transceiver 310 receives, from the antenna 305, an incoming RF signal transmitted by another component on a system. For example, the RF transceiver 310 receives RF signal transmitted by a BLUETOOTH or WI-FI signal from an access point (such as a base station, Wi-Fi router, Bluetooth device) of the network 102 (such as a WI-FI, BLUETOOTH, cellular, 5G, LTE, LTE-A, WiMAX, or any other type of wireless network). The RF transceiver 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 is also capable of executing other applications 362 resident in the memory 360, such as, integrating and rendering timed text into an omnidirectional 360° media scene one or more applications for remittance, fraud detection, and the like.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute plurality of applications 362 based on the OS 361 or in response to signals received from eNBs or an operator. The processor 340 is also coupled to the I/O interface 345 that provides the electronic device 300 with the ability to connect to other devices, such as client devices 106-115. The I/O interface 345 is the communication path between these accessories and the processor 340.

The processor 340 is also coupled to the input 350. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing thereby allowing a user to input a voice command via microphone 320. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. For example, in the capacitive scheme, the input 350 can recognize touch or proximity. The input 350 can also include a control circuit. Input 350 can be associated with sensor(s) 365 and/or a camera by providing additional input to processor 340. As discussed in greater detail below, sensor 365 includes inertial sensors (such as, accelerometers, gyroscope, and magnetometer), optical sensors, motion sensors, cameras, pressure sensors, heart rate sensors, altimeter, and the like. For example, input 350 can utilize motion as detected by a motion sensor, associated with sensor 365, as an input.

The processor 340 is also coupled to the display 355. The display 355 can be a liquid crystal display (LCD), light-emitting diode (LED) display, optical LED (OLED), active matrix OLED (AMOLED), or other display capable of rendering text and/or graphics, such as from websites, videos, games, images, and the like. Display 355 can be sized to fit within a HMD. Display 355 can be a singular display screen or multiple display screens capable of creating a stereoscopic display. In certain embodiments, display 355 is a heads up display (HUD).

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc.

Electronic device 300 can further include one or more sensors 365 that meter a physical quantity or detect an activation state of the electronic device 300 and convert metered or detected information into an electrical signal. For example, sensor(s) 365 may include one or more buttons for touch input (located on the headset or the electronic device 300), one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (such as a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor(s) 365 can further include a control circuit for controlling at least one of the sensors included therein. As will be discussed in greater detail below, one or more of these sensor(s) 365 may be used to control a user interface (UI), detect UI inputs, determine the orientation and facing direction of the user for three-dimensional content display identification, etc. Any of these sensor(s) 365 may be located within the electronic device 300, within a headset configured to hold the electronic device 300, or in a singular device where the electronic device 300 includes a headset.

As will be discussed in greater detail below, in this illustrative embodiment, electronic device 300 receives a signal that containing omnidirectional video data that includes timed text data. The electronic device 300 extrapolates the timed text data embedded within the omnidirectional video data in order to display the timed text such as subtitles, close caption, open caption text, and the like. In certain embodiments, the timed text can be positioned relative to a current viewport. That is, the text is visible within the omnidirectional scene regardless of the direction the viewer is looking. For example, the timed text cues can be rendered relative to a region on the current viewport, such that the text is always visible independent of the viewing direction of the user. In certain embodiments, the timed text can be positioned relative to the whole video. That is the text is visible in only one or more locations within the omnidirectional video data. For example, the cue box of the timed text can be rendered on a certain region relative the sphere, such that the text is visible only when the user looks in a specific direction within the omnidirectional 360° video.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
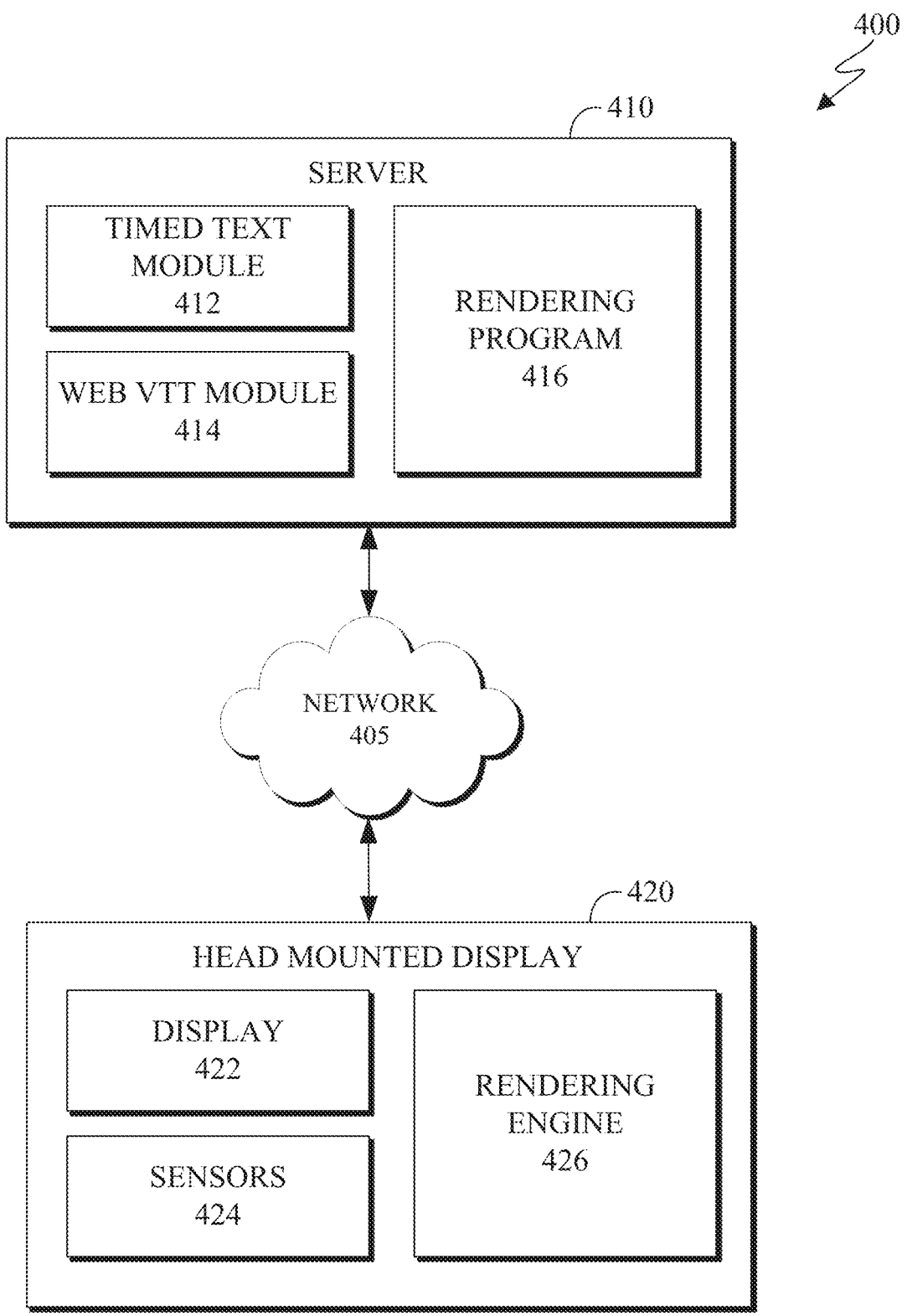
FIG. 4 illustrates an example block diagram, of a communication system in accordance with an embodiment of this disclosure.

FIG. 4 illustrates an example block diagram of a communication system in accordance with an embodiment of this disclosure. The communication system 400 includes a server 410 and a head mounted display (HMD) 420 in communication over network 405. The embodiment of the communication system 400 shown in FIG. 4 is for illustration only. Other embodiments could be used without departing from the scope of the present disclosure.

Communication system 400 illustrates a high-level overview of an embodiment of the present disclosure of a server 410 that can embed timed text within an omnidirectional 360° video, and an HMD 420 that can display timed text in an omnidirectional 360° video to a user over network 405. Network 405 can be configured similar to network 102 of FIG. 1. Server 410 can be configured similar to server 104 of FIG. 1 and can include internal components similar to that of server 200 of FIG. 2. HMD 420 can be configured similar to any of the one or more client devices 106-115 of FIG. 1, and can include internal components similar to that of electronic device 300 of FIG. 3. In certain embodiments, the HMD 420 is not limited to a head mounted display device. For example, HMD 420 can be a smart phone (similar to mobile device 108 of FIG. 1), a laptop computer (similar to laptop computer 112 of FIG. 1), a desktop computer (similar to desktop computer 106 of FIG. 1), a tablet computer (similar to tablet computer 114 of FIG. 1), and the like.

Network 405 is be used to provide communication between the server 410 to the HMD 420. Network 405 can be personal area network (PAN), Local Area Networks (LANs), Wireless Local Area Networks (WLANs), the Internet, the Public Switched Telephone Network (PSTN), as well as other wireless networks. Network 405 may also be the Internet representing a worldwide collection of networks and gateways that use Transmission Control Protocol/Internet Protocol (TCP/IP) protocols to communicate with one another. Network 405 includes a cable, a router, switches a firewall, or a combination thereof. Network 405 can include a variety of connections, such as, wired, wireless or fiber optic connections.

Server 410 adapts the timed text and timed graphics to be rendered into omnidirectional 360° video. In certain embodiments server 410 can be associated with one or more servers that provide the multimedia data and the timed text data. For example, server 410 receives the timed text data and the multimedia data that includes omnidirectional 360° video. The server then adapts the rendering of the timed text with the received omnidirectional 360° video.

Server 410 can be a web server, a server computer such as a management server, or any other electronic computing system capable of sending and receiving data. In certain embodiments, server 410 is a "cloud" of computers interconnected by one or more networks, where server 410 is a computing system utilizing clustered computers and components to act as a single pool of seamless resources when accessed through network 405. Server 410 includes a timed text module 412, a web video text tracks (VTT) module 414, and a rendering program 416. In certain embodiments the timed text module 412, the web VTT module 414, and the rendering program 416 are a single element. For explanatory purposes the elements are broken up into independent components.

Timed text module 412 allows content authors to link external text to a media presentation. A content author is the person, group of persons, or an entity that determines the placement of the text as well as the actual text that is included in the timed text as subtitles or open/closed captioning that can be displayed while viewing a movie.

Timed text module 412 manages the placement of text, such as subtitles, in videos without actually embedding the text into the video itself. This allows the text to be activated and deactivated as required by the user, or provides an ability to easily change the language of the text. For example, if the user is hearing impaired, the user can activate the timed text so as to function as subtitles. In another example, if the user is viewing a video in a foreign language, the timed text can display a translation of the audio into the primary language of the user.

Timed text module 412 utilizes a timed text markup language (TTML) that provides a representation of textual information with stylistic, layout and timing semantics that are associated by an author for the purpose of interchange and processing. A TTML document is an extensible markup language (XML) document that includes a timed text document element that contains a header and a body. The header of a TTML document specifies document level metadata, styling definitions, and layout definitions. The body of a TTML document specifies text content intermixed with references to style and layout information and inline styling and timing information.

TTML uses the region element to define a rectangular box that is used to display timed text. An example of a region element is depicted with respect to FIG. 5. In certain embodiments, the region is assigned a time element that indicates when the region is able to display timed text. For example, the region can be assigned 'begin' and 'end' information, that indicates when to commence and finish the display of the timed text. That is, the 'begin' indicates when the video player (such as the rendering engine 426) of the HMD 420 is to start showing a line of text at a given time and the 'end' indicates when to remove the text. In another example, the region can be assigned a "begin" and "duration" information, that indicates when the display and for how long to display the timed text. That is the 'begin' indicates when the video player (such as the rendering engine 426) of the electronic device is to start showing a line of text at a given time and the 'duration' indicates for how long the timed text is to be displayed. Upon the expiration of the duration, the text is removed. TTML styling is used to position the region with respect to the video. Timed text module 412 also indicates the locating to display the timed text, within the display screen.

Timed text module 412 can also manage timed graphics. Timed graphics is a media type that enables advance subtitle services similar to timed text. Timed text module 412 can include scalable vector graphics to be overlaid over a video Web VTT module 414 is similar to timed text module 412. For example, timed text module 412 utilizes TTML in an XML document to associate timed text with the video. Web VTT module 414 is another type of file format that can utilize HTML5 to associate timed text with the video. Web VTT module 414 can be used in conjunction with HTML5 through the <track> element and as such associate timed text content with the main video to provide subtitles, captions, and descriptions for media resources. Web VTT module 414 allows for synchronization of the timed text with the main video/audio of the media content.

Web VTT module 414 can utilize web VTT files to synchronize timed text, with the main video/audio of the media content. In certain embodiments, a web VTT files is a simple textual format with UTF-8 encoding and the .vtt file extension. A web VTT file, for example, commences with a string 'WEB VTT.' The content of a web VTT file includes zero or more web VTT cues, each of which is separated by two or more web VTT line terminators. A web VTT line terminator includes a carriage return, a line feed, or both. A web VTT cue is a text track cue. An example web VTT cue can include one or more of the following: (i) a cue box, (ii) a writing direction, (iii) a snap-to-lines flag, (iv) a line, (v) a line alignment, (vi) a position, (vii) a position alignment, (viii) a size, (ix) a text alignment, and (x) a region. Where the cue box of a web VTT cue is a box within which the text of all lines of the cue is to be rendered. The writing direction is the direction of the text. The writing direction can either be horizontal, vertical growing left, or vertical growing right. The snap-to-lines flag is a boolean indicating whether the line is an integer number of lines or whether it is a percentage of the dimension of the video. The line defines positioning of the cue box. For example the line offsets the cue box from the top, the right or left of the video viewport as defined by the writing direction, the snap-to-lines flag, or the lines occupied by any other showing tracks. The line alignment is an alignment for the cue box's line that can be start alignment, center alignment, end alignment. The position defines the indent of the cue box in the direction defined by the writing direction. The position is either (i) a number giving the position of the cue box as a percentage value or (ii) a special value auto. The special value auto indicates that the position depends on the text alignment of the cue. The position alignment is an alignment for the cue box in the dimension of the writing direction, describing what the position is anchored to. For example, the position alignment can be one of the following values: start alignment, center alignment, end alignment, auto alignment. The size is a number that indicates the size of the cue box, where the number is interpreted as a percentage of the video as defined by the writing direction. The text alignment is an alignment for all lines of text within the cue box in the dimension of the writing direction. The text alignment can be one of the following values: start alignment, center alignment, end alignment, left alignment, or right alignment. The region is an optional web VTT region that the cue box belongs.

In certain embodiments, if a web VTT file is stored as an ISOBMFF file, then the web VTT module 414 follows the specification in ISO/IEC 14496-30. When a web VTT file is stored, text and cue boxes associated with the web VTT file are decomposed by the web VTT module 414. The text and the cue box are decomposed, in order for the text to be stored separately from the style and timing information. That is, the web VTT module 414 can separate the text of the actual cue from the structural information that the web VTT file carries, such as positioning, timing, and the like. For example, each web VTT cue is stored de-constructed, as the web VTT cue timing information does not determine the presentation timing. In another example, a web VTT cue is stored in an ISO boxed structured approach to enable interfacing an ISO file reader with a web VTT renderer without the need to serialize the sample content as web VTT text and to parse it again. Web VTT module 414 can also overwrite the sample timing of the start time of the web VTT text within the cue box.

Figure 8:
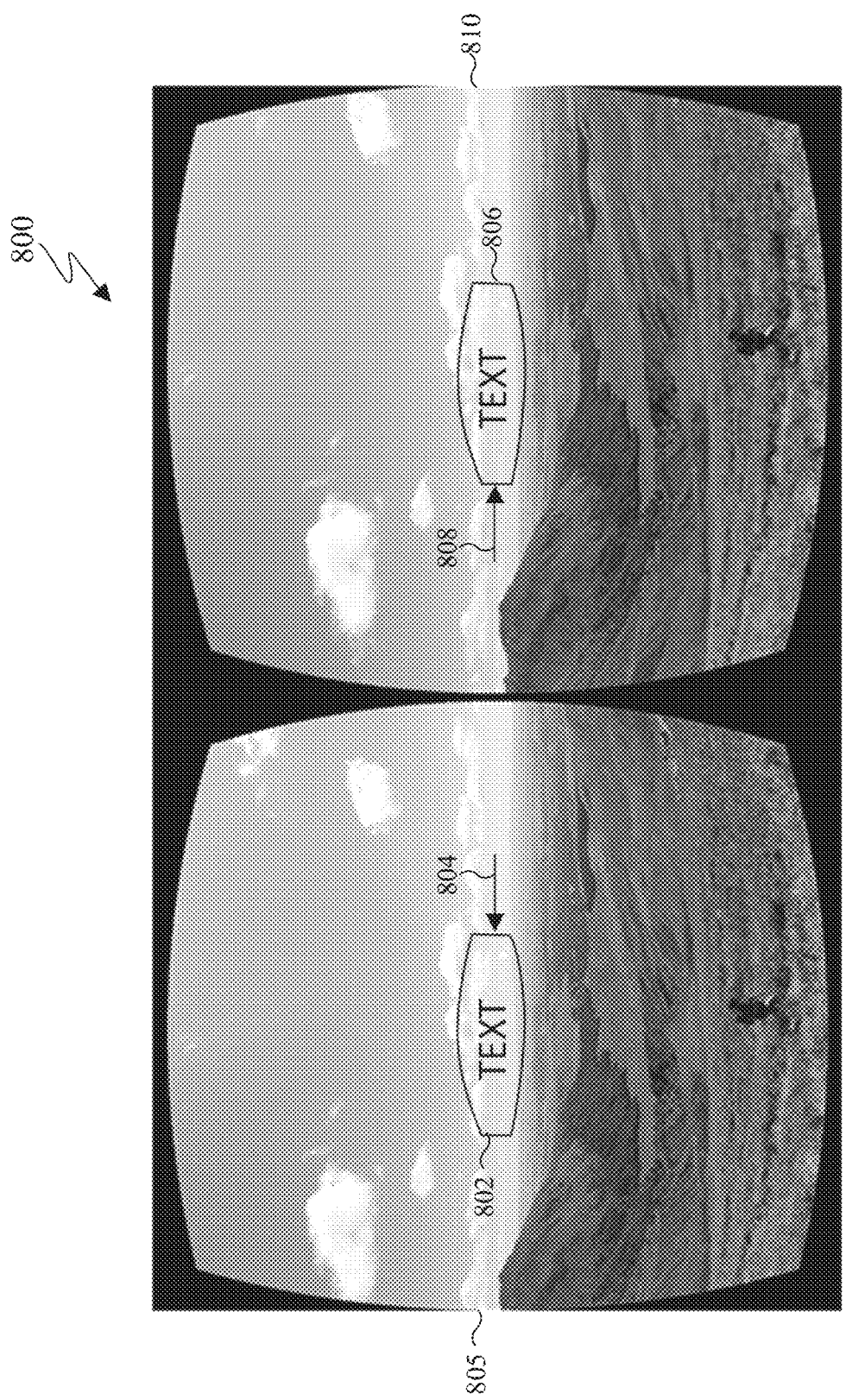
FIG. 8 illustrates timed text displayed in a stereoscopic displays in accordance with an embodiment of this disclosure.

Rendering program 416 renders timed text in an omnidirectional 360° video. Rendering program 416 allows for the rendering of timed text information such as web VTT on VR and 360° video. Rendering program 416 allows for the content author to signal various aspects of the omnidirectional 360° video in order to display timed text in a spherical coordinate system. Rendering program 416 is capable of rendering timed text information in a position on a display that is relative to the position of an omnidirectional 360° video in order to avoid depth mismatch issues. In certain embodiments, rendering program 416 allows a content author to indicate regions that are relative to the current viewport and differentiate them from regions that are relative to the whole video. That is, the rendering program 416 allows a content author to indicate whether the (i) timed text is always visible to a user on a fixed region, relative to the current viewport, regardless of the direction the user is viewing the 360° video, or (ii) timed text is visible in one or more fixed locations, relative to the whole omnidirectional 360° video. In certain embodiments, rendering program 416 provides for a content author to include disparity compensation to the cue box position in order to adjust for stereoscopic video rendering. The disparity compensation allows the cue box to be shifted to correspond to a similar location with respect to each eye of the user. For example, if the cue box is in the lower right side with respect to the left eye, the cue box will be positioned in the lower left side with respect to the right eye of the user. In certain embodiments, rendering program 416 renders the cues in stereo video in a fixed location on both stereo views. FIG. 8, discussed below illustrates the disparity compensation for a stereoscopic display. In certain embodiments, rendering program 416 renders the cues in stereo video that is assigned correct depth to the cue box. In certain embodiments, rendering program 416 instructs how to handle multiple simultaneous cues that are to be rendered in different regions. In certain embodiments, rendering program 416 allows a content author to utilize spherical coordinates to position the cue regions. In certain embodiments, rendering program 416 allows a content author to project the timed text on a two dimensional plan in order that the timed text is rendered on the targeted geometry in a non-distorted manner.

Figure 6:
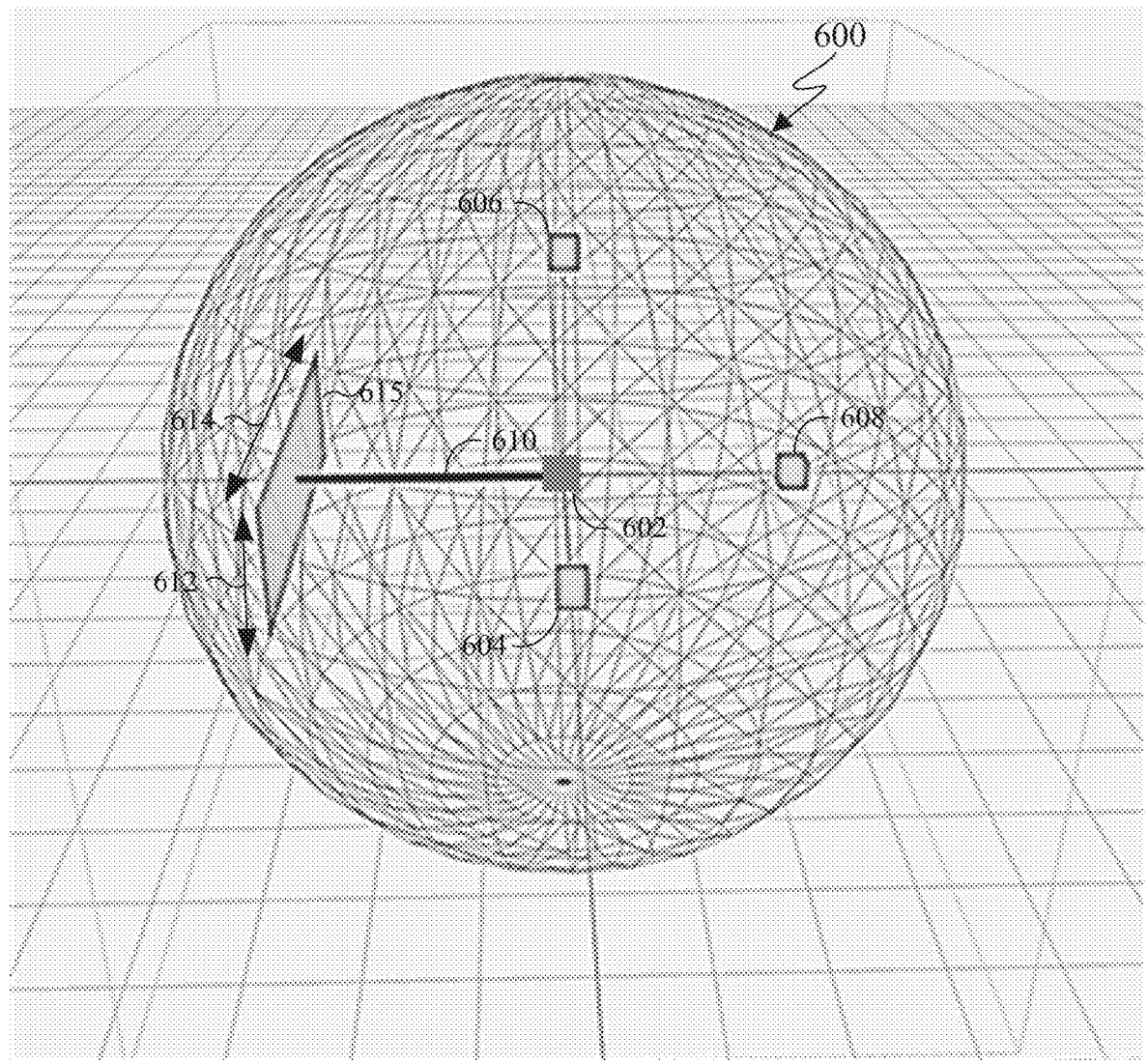
FIG. 6 illustrates an example rectangular plane for rendering timed text within a sphere in accordance with an embodiment of this disclosure.

Rendering program 416 allows for a content author to render timed text in three-dimensional space. For example, rendering program 416 creates a plane in three-dimensional space based on orientation and depth. Depth is identified as the distance to the center of the geometry. The plane can be any shape, such as a square, rectangle, circle, oval, and the like. Text is then rendered on the plane. Rendering program 416 provides signaling parameters for the depth of the plane, the orientation of the plane, and the dimensional size and shape of the plane. The orientation of the plane is based on yaw, pitch, and roll. Rendering program 416 provides a flag to indicate whether the timed text is to be rendered relative to the current viewport or relative to the 360° video. FIG. 6, discussed below, illustrates the rendering of the plane in three-dimensional space. If the flag indicates that the relative to the 360° video, then the rendering program 416 ensures that the timed text is not distorted, by initiating a disparity function.

Examples of syntax for rendering of timed text in omnidirectional 360° video are provided below. The example below is a restricted sample entry that describes the timed text track and is used to indicate to the parser that special handling of the timed text is needed. For example, the sample entry below includes information to specify viewport relationship or video relationship.

For indicating timed text to video relationship:

```
Syntax
class WVTTSampleEntry( ) extends PlainTextSampleEntry ('wvtt'){
    WebVTTConfigurationBox   config;
    WebVTTSourceLabelBox     label;      // recommended
    MPEG4BitRateBox ( );                 // optional
    AdditionalConfigurationBox addconfig;
}
class addconfig extends Box('adtc') {
    unsigned int(1) viewport_dependent_flag;
    unsigned int(7) reserved;
}
```

In the above example, the syntax is extended to include information that specifies the viewport relationship or the video relationship. The viewport_dependent_flag specifies how the timed text cue boxes are to be rendered. For example, a timed text cue box can be (i) rendered on a certain region relative to the sphere, such that the cue is only visible when the user looks in a specific direction, or (ii) rendered in a region on the current viewport, such that the cue is always visible irrespective of the viewing direction. The viewport_dependent_flag can either be true or false and specifies ether the cue box and the text regions are relative to the current viewport or relative to the whole video.

If the viewport_dependent_flag is set to true, then the cue box and any text regions are positioned relative to the current viewport. That is, the timed text is always present on the display screen. For example, the text region is visible independently of the viewing direction of the user. The current viewport is determined based on the position of the head of the viewer, as measured by the HMD and provided to the rendering program 416. In the example above, the viewport_dependent_flag is set to true when viewport_dependent_flag=1.

If the viewport_dependent_flag is set to false, then the cue box and any text regions are positioned relative to the whole video. That is, the text region is rendered at a certain position on the sphere. For example, the text region is only visible when the user is looking in the direction where the text region is rendered. In the example above, the viewport_dependent_flag is set to false when viewport_dependent_flag=0. In certain embodiments, the default value for viewport_dependent_flag is false.

In certain embodiments, if the viewport_dependent_flag is set to false (indicating that the cue box and any text regions are positioned relative to the whole video), then the positions of the cue box and text regions are indicated by spherical coordinates. The example syntax below indicates the type of mapping from a rectangular two-dimensional cue box to a spherical region.

For mapping a cue box to a spherical region relative to the whole video:

```
Syntax
class addconfig extends Box('adtc') {
    unsigned int(1) viewport_dependent_flag;
    unsigned int(7) reserved;
    if (viewport_dependent_flag == 0) {
        boxstring region_id;
        unsigned int(16) left_yaw;
        unsigned int(16) top_pitch;
        unsigned int(16) horizontal_fov;
        unsigned int(16) vertical_fov;
    }
    unsigned int(8)  mapping_type;
}
```

The above example syntax for mapping a two-dimensional cue box to a spherical region the viewport_dependent_flag is set to 0 indicating that the cue box and any text regions are positioned relative to the whole video. The boxstring region_id specifies the identifier of the text region. This identifier is associated with to the identifier of the regions defined in the timed text streams in the web VTT or TTML track. For example the boxstring region_id indicates a region on the sphere that is assigned an identification that identifies the region in the timed text. The left_yaw indicates the value of the yaw angles of the coordinates of the text region of the cue plane. The top_pitch indicates the value of the pitch of the coordinates of the text region of the cue plane. The horizontal_fov indicates the horizontal field of view of the user, based on the position of the head of the viewer, as measured by sensors with the HMD 420 and provided to the rendering program 416. The vertical_fov indicates the vertical field of view of the user, based on the position of the head of the viewer, as measured by sensors with the HMD 420 and provided to the rendering program 416.

It is noted that more than one cue box and text region can be present in the syntax above. For example, each cue box and text region can be designated with its own boxstring region_id to indicate the location of each cue box and text region within the sphere. The identification of each cue box and text region is associated with the identifier of the regions as defined in the timed text streams of the web VTT or TTML track.

In certain embodiments, if the viewport_dependent_flag is set to false (indicating that the cue box and any text regions are positioned relative to the whole video), and the positions of the cue box and text regions are indicated by spherical coordinates, then the three-dimensional space of the region is indicated to correct for disparity, when the timed text is rendered on the HMD 420. Alternatively, the disparity amount is provided. The example syntax below indicates a provided disparity amount.

For mapping a cue box to a spherical region relative to the whole video with a disparity amount:

```
Syntax
class addconfig extends Box('adtc') {
    unsigned int(1) viewport_dependent_flag;
    unsigned int(7) reserved;
    if (viewport_dependent_flag == 0) {
        boxstring region_id;
        unsigned int(16) left_yaw;
        unsigned int(16) top_pitch;
        unsigned int(16) horizontal_fov;
        unsigned int(16) vertical_fov;
        unsigned int(7) reserved;
        unsigned int(1) disparity_indication_flag;
        if (disparity_indication_flag == 1) {
            unsigned int(16) disparity_in_pixels;
            unsigned int(16) region_depth;
        }
    }
    unsigned int(8)  mapping_type;
}
```

The above example syntax the disparity_indication_flag is set to 1 specifying a specific disparity value. The disparity value is used during stereoscopic viewing. For example, the cue box and text region are shifted by the indicated disparity value and in opposite directions for the left and right half of the view screen. In another example, the cue box and text region are shifted by a derived value instead of an indicated value. The disparity_in_pixels indicates a value to displace the region to the left on the left eye view and to the right on the right eye view. The disparity_in_pixels provides a disparity in pixel value scaled by a factor. The factor for example can be 32768. The pixel value can be negative or positive. If the pixel value is negative the displacement direction is reversed. The region_depth indicates the depth of the region on which the timed text is to be rendered. For example the depth represents the Z-Coordinate. The depth value is the norm of a normal vector of timed text region. In certain embodiments the value is relative to a normalized sphere with a radius of 1.0 and can be scaled by a factor of 65536. It is noted that other factors and radiuses can be used in the disparity_in_pixels and the region_depth elements.

In certain embodiments a disparity_in_percent is used instead of the disparity_in_pixels. The disparity_in_percent provides a percentage value of the width of the half view scaled by a factor, to indicate the disparity. The factor for example, can be represented by the value 32768. It is noted that other factors can be used. This value is used to displace the region to the left on the left eye view and to the right on the right eye view.

Once rendering program 416 compiles the omnidirectional 360° video, the video, along with the timed text, is transmitted to the HMD 420 through network 405. In certain embodiments the omnidirectional 360° video can be streaming from the server 410 to the HMD 420.

In certain embodiments, HMD 420 is a mobile phone (similar to mobile device 108 of FIG. 1). In certain embodiments, HMD 420 is a computer device similar to a desktop computer (similar to desktop computer 106 of FIG. 1), a laptop computer (similar to laptop computer 112 of FIG. 1), or a tablet computer (similar to tablet computer 114 of FIG. 1). In certain embodiments, HMD 420 is a head mounted display (similar to HMD 115 of FIG. 1) and worn by the user.

HMD 420 renders and displays the timed text and timed graphics onto a display for a user to view. HMD 420 is a device capable of displaying content, such as images, videos, and text, through a graphical user interface (GUI), such as display 422. In certain embodiments, HMD 420 is a head mounted display capable of displaying VR, augmented reality (AR) and mixed media reality to a user. For example the HMD 420 can completely replace the FOV of a user with a display depicting a simulated visual component. The head mounted display can also include headphones to provide the user with the accompanying audio. In certain embodiments, HMD 420 is a stereoscopic display. HMD 420 includes a display 422, one or more sensors 424, and rendering engine 426.

Display 422 is similar to display 355 of FIG. 3. In certain embodiments, display 422 is a single display and affixed to the HMD 420. For example, display 422 is similar to a display screen on mobile device, or a display screen on a computer or tablet. In certain embodiments, display 422 is a display on mobile device and the mobile device (including the display) is affixed to a head mounted display. Once affixed to a head mounted display, the display 422 and can project VR, AR, and the like. In certain embodiments, display 422 is a stereoscopic display. Stereoscopic display is a display capable of conveying depth perception to a user.

Sensors 424 are similar to sensor 365 of FIG. 3. Sensors 424 provide for head and motion tracking of the user based on the position of the head. By tracking the motion of the motion of the head of the user, allows the rendering engine 426 to simulated visual and audio components in order to ensure that, from the user's perspective, items and sound sources remain consistent with the user's movements.

Rendering engine 426 is associated with rendering program 416. Rendering engine 426 analyzes the received omnidirectional 360° video, and detects whether the video includes any timed text data. Upon detecting timed text, the rendering engine 426 derives the location of the cue box within the three-dimensional video. Rendering engine 426 then renders the cue box and text regions with the omnidirectional 360° video to be displayed on display 422.

Rendering engine 426 identifies whether the viewport_dependent_flag is true or false. If the viewport_dependent_flag is set to false (set to 0) the rendering engine 426 commences by setting up the VR scene geometry by creating a sphere and placing the rendering camera in the center of the sphere. The rendering camera is dependent on whether the omnidirectional 360° video is mono or stereo vision. For example, if the omnidirectional 360° video is stereo, then video is rendered for a stereoscopic display. Thereafter, for each text that is to be rendered at various time intervals the rendering engine 426 fetches the corresponding information about the depth (d), direction (u, and v), and a two-dimensions of the region. The rendering engine 426 then creates a three-dimensional plane with the normal vector calculated out of the depth (d), direction (u, and v). Rendering engine 426 then renders the cue box on the plane and the corresponding two-dimensional rectangle with a center of the rectangle being at the normal vector.

If the viewport_dependent_flag is set to true (set to 1) the rendering engine 426 commences by reading the region and disparity information for each cue box at each time interval. After rendering the omnidirectional video on a stereoscopic display, the rendering engine 426 renders the text in the rectangular region or cue box based on the disparity information. For example, regarding the left half of the screen, the rendering engine 426 displaces the rectangular region to the left as indicated by the disparity information. Regarding the right half of the screen, the rendering engine 426 displaces the rectangular region to the right as indicated by the disparity information. Rendering engine 426 then renders the text in the displaced region of the cue box.

In certain embodiments, rendering engine 426 can render a cue box after rendering the VR viewport as an overlay layer. Rendering the text within the cue box after rendering the VR viewport is useful when the cue box or text region is relative to the current viewport and not the video (such as the case when the viewport_dependent_flag is set to 1 to indicate true). The stereoscopic effect is rendered using an indicated disparity value such as the disparity_in_pixels as discussed above.

In certain embodiments, rendering engine 426 can render a cue box prior to the rendering of the viewport to the screen. In the case of a spherical geometry, the cue box and text region can be a plane that is placed inside the sphere at the desired depth. In another example, the cue box and text region are located at a spherical region of which the contents from the main video overlay the contents from the cue box and text region. The cue box and text region can be indicated as a spherical region. In certain embodiments, rendering engine 426 can first render the projected omnidirectional 360° video such as an ERP. Thereafter, the timed text is rendered on the viewport.

Figure 5:
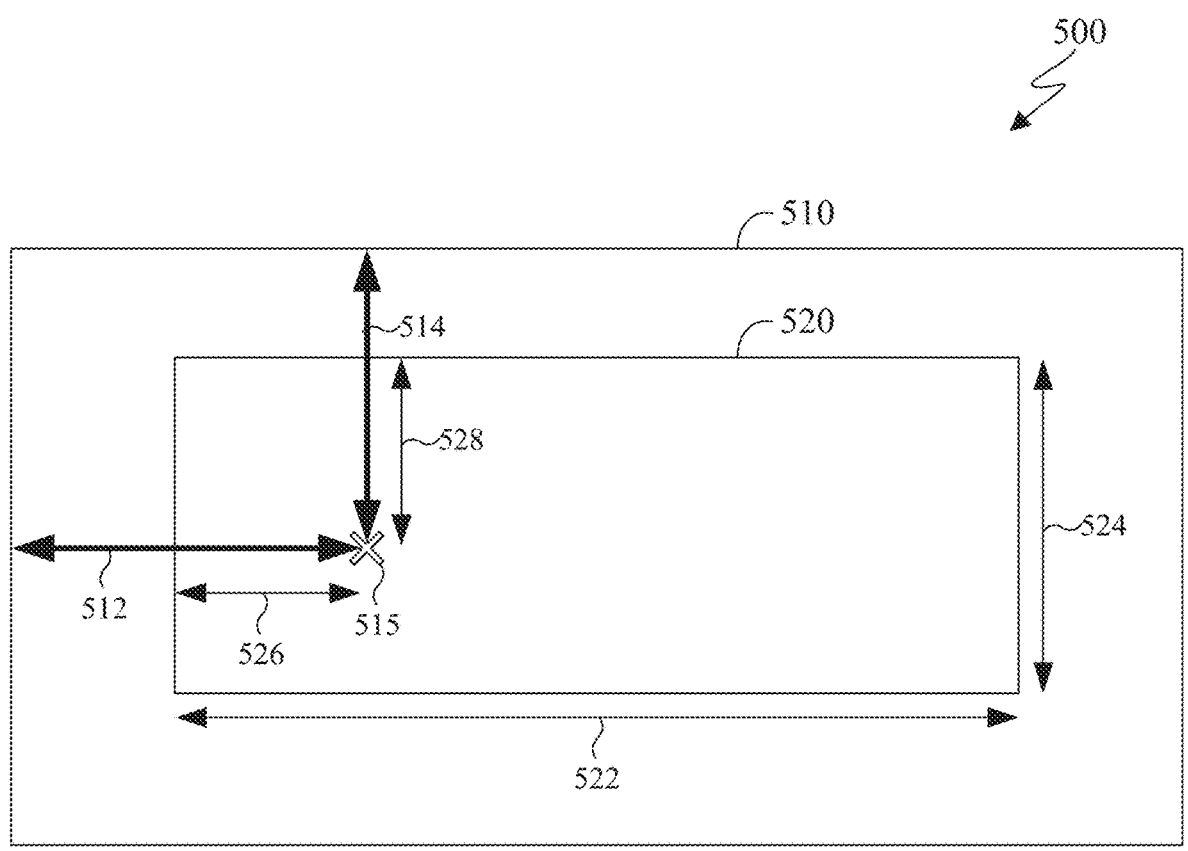
FIG. 5 illustrates an example video viewport with a web VTT cue box in accordance with an embodiment of this disclosure.

FIG. 5 illustrates an example video viewport with a web VTT cue box in accordance with an embodiment of this disclosure. FIG. 5 illustrates environment 500 depicting the positioning of a cue box for depicting timed text. In certain embodiments the positioning of the cue box can be based on TTML, a web VTT file, or the like. The embodiment of the environment 500 shown in FIG. 5 is for illustration only. Other embodiments could be used without departing from the scope of the present disclosure.

Video viewport 510 represents a display displaying content. For example, the video viewport 510 is a display screen illustrating a two-dimensional content. In another example, the video viewport 510 is the current view the user appreciates when viewing an omnidirectional 360° video. The content can be a singular image, a movie, or the like. Web VTT region 520 is the cue box where the timed text is to be rendered and displayed. The web VTT region 520 is not visible to the user. Rather the web VTT region 520 represents the graphical coordinates where timed text can be displayed within video viewport 510. In certain embodiments multiple web VTT regions 520 can be within the video viewport 510. Once a web VTT region 520 is defined within the video viewport 510, the web VTT region 520 can continually display text or remain dormant until an instruction is received to display timed text. The web VTT region 520 is defined by the region width 522 and the region line 524 (height). The region width 522 is the width of the region. The region line 524 is the height of the web VTT region 520. The region width 522 and the region line 524 offset the web VTT region 520 from the top, right, or left of the video viewport 510 as defined by the writing direction, snap-to lines (a boolean indicating whether the line is an integer or a percentage of the video viewport 510).

Text location 515 is the location of where the text is to start within the web VTT region 520. Text location 515 is defined by the region anchor X 526 and the region anchor Y 528 with respect to the web VTT region 520, and the region viewport anchor X 512 and the region viewport anchor Y 514 with respect to the video viewport 510. Therefore, the text location 515 commences at the same location regardless of the web VTT region 520 location within the current video viewport 510. In certain embodiments, then the region viewport anchor X 512 and region viewport anchor Y 514 are anchored to the current viewport and not the whole video, if the video content is an omnidirectional 360° video. For example, regardless of where the user views within the 360° video, if the text location is anchored at that specific location with respect to the current viewport, the timed text will appear in the same location even if the user moves their viewing direction thereby changing the current viewport. In certain embodiments, the region viewport anchor X 512 and region viewport anchor Y 514 are anchored to the whole video and not the current viewport of the user. For example, the user can view the timed text only when the user is viewing at the specific direction with respect to the region viewport anchor X 512 and region viewport anchor Y 514.

FIG. 6 illustrates an example rectangular plane for rendering timed text within a sphere in accordance with an embodiment of this disclosure. FIG. 6 illustrates an environment depicting a sphere 600. Sphere 600 illustrates an omnidirectional 360° video with the user viewing from location 602. The VR scene geometry is created a sphere and placing the rendering camera in the center of the sphere at location 602, and rendering the 360° video around the location 602. For example, the user can look up, down, left and right in 360° and view objects within the video. The field of view of the user is limited to the viewing direction within the sphere 600 as viewed from location 602. Object 604, 606, and 608 represent content that is located throughout the sphere 600. If user is viewing object 606, the user cannot view object 604 as each object are opposite each other, and the field of view of the user is not 180°.

Plane 615 is located a distance 610 from the location 602 (center of the sphere and the location of the user). Distance 610 is the depth value indicating the distance the cue box is from the viewpoint of the user. A cue box (similar to the web VTT region 520 of FIG. 5) is located on plane 615. Plane 615 is positioned relative to the whole video. That is, the text is rendered at a certain position on the sphere. For example, the text region is only visible when the user is looking in the direction where the text region is rendered.

Plane 615 is a two-dimensional rectangle plane with a center of the rectangle located along the distance 610 from location 602. The orientation of plane 615 is defined by yaw, pitch, and roll. The size of the plane 615 determined by the height 612 and width 614, with the center of the plane 615 positioned along the distance 610. Text rendered on the cue box on plane 615 is visible only when the user looks in the specific direction of the plane 615. For example, when the user views the plane 615 the user cannot view object 608, as object 608 and the plane 615 are opposite each other.

Figure 7:
FIG. 7 illustrates timed text displayed in accordance with an embodiment of this disclosure.
Figure 9:
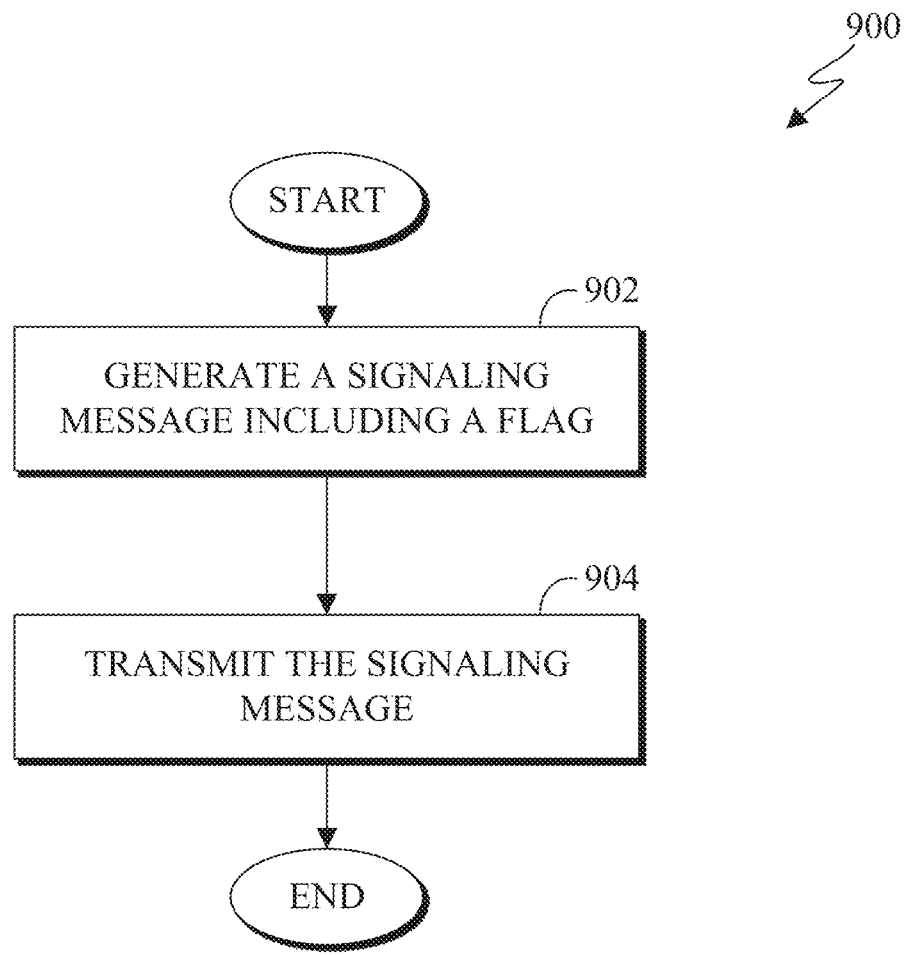
FIG. 9 illustrates an example flowchart for rendering timed text in accordance with an embodiment of this disclosure.

FIGS. 7 and 8 illustrates timed text displayed in accordance with an embodiment of this disclosure. FIG. 7 illustrates a single displays 700 with cue box 705 displayed at the center of the field of view of the user. FIG. 8 illustrates a stereoscopic display 800 with cue box 802 displayed on the user's left display 805 and cue box 806 displayed on the user's right display 810. A disparity value is used during stereoscopic viewing to shift the cue box 802 and 806 by a disparity value and in opposite directions for the left and right half of the view screen. Disparity compensation allows the cue box to be shifted to correspond to a similar location with respect to each eye of the user. Arrow 804 indicates the cue box 802 being shifted to the left and arrow 808 indicates the cue box 806 being shifted to the right FIG. 9 illustrates a method for rendering timed text in accordance with an embodiment of this disclosure. FIG. 9 depicts flowchart 900, for supporting timed text within omnidirectional video. For example, the process depicted in FIG. 9 is described as implemented by the server 200, in FIG. 2, or server 410, with respect to electronic device such as any one of the client devices 106-115, or HMD 420.

The process begins with server 410 generate a signaling message (902). The signaling message includes a flag that indicates whether a position of the timed text to be rendered within the omnidirectional video is dependent on a viewport of the omnidirectional video.

When the flag indicates that the position of the timed text is dependent on the viewport indicate that the timed text in a fixed location within the viewport. That is the fixed location is independent of a viewing direction within omnidirectional video. Additionally, when the flag indicates that the position of the timed text is dependent on the viewport, then the process can generate parameters to adjust for a depth disparity of the timed text.

When the flag indicating that the position of the timed text is not dependent, on the viewport, indicates that the position of the timed text within the omnidirectional video is relative to the omnidirectional video. Additionally, when the flag indicates that the position of the timed text is not dependent on the viewport, then the process can generate parameters to position the timed text within the omnidirectional video.

The process then transmits the signaling message through a communication interface (904). For example, the communication interface configured to transmit the signaling message to an electronic device to indicate whether the position of the timed text within the omnidirectional video is dependent on the viewport for rendering of the timed text within the omnidirectional video.

Figure 10:
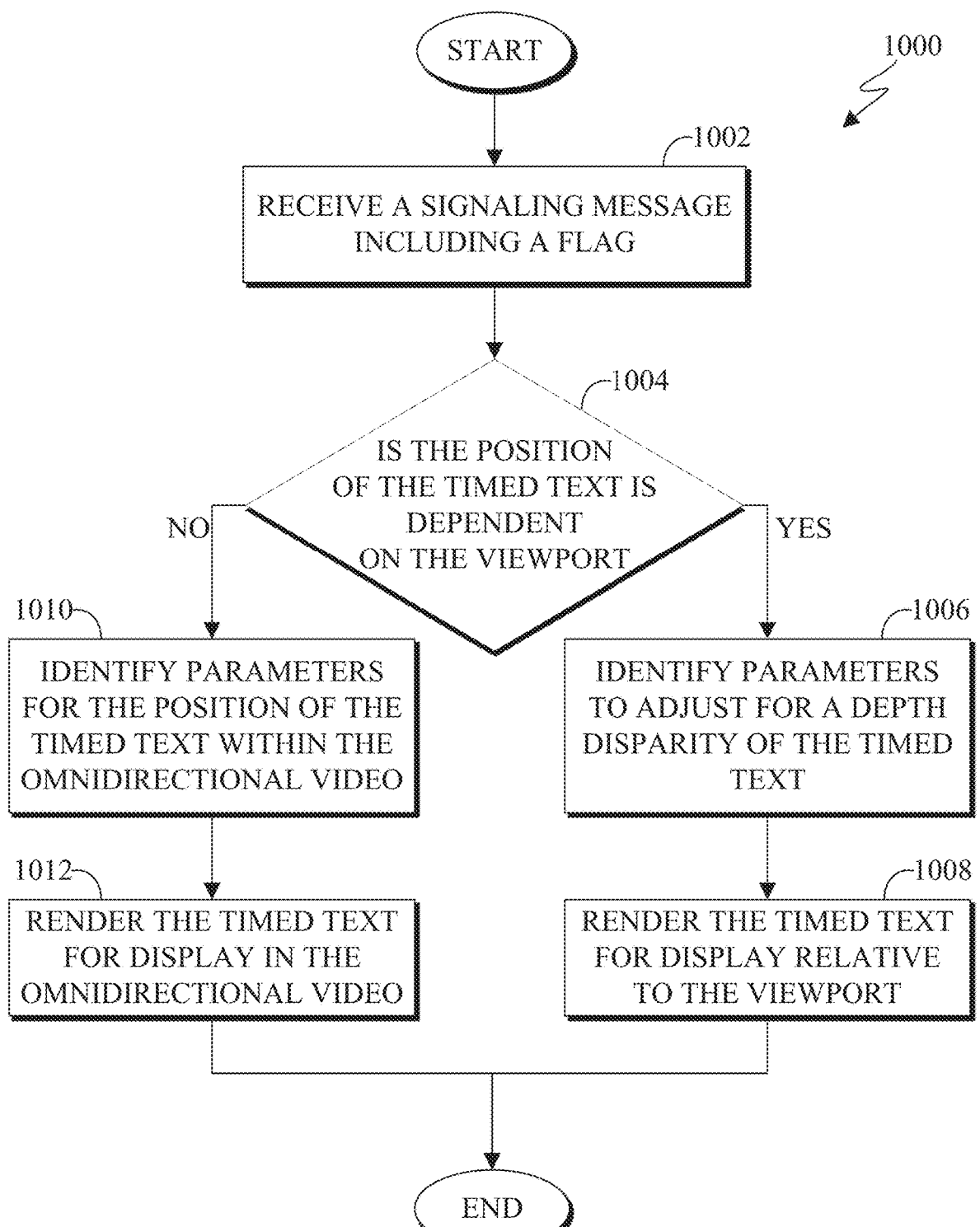
FIG. 10 illustrates an example flowchart for rendering timed text in accordance with an embodiment of this disclosure

FIG. 10 illustrates a method for rendering timed text in accordance with an embodiment of this disclosure. FIG. 10 depicts flowchart 1000, for displaying timed text in an omnidirectional 360° video according to this disclosure. For example, the process depicted in FIG. 10 is described as implemented by the electronic device 300 of FIG. 3, HMD 420 of FIG. 4, or any one of the client devices 106-115 of FIG. 1, with respect to server 104 of FIG. 1, or server 200 of FIG. 2.

The process begins with an electronic device, such as HMD 420 receiving a signaling message. (1002). The signaling message includes a flag that indicating whether a position of the timed text within the omnidirectional video is dependent on a viewport of the omnidirectional video.

The process then determines whether the position of the timed text within the omnidirectional video is dependent on the viewport based on the flag (1004). Thereafter the process renders the timed text within the omnidirectional video based on the determination.

If it is determined that the position of the timed text is dependent on the viewport, the process follows the 'yes' branch (1006). If it is determined that the position of the timed text is not dependent on the viewport, the process follows the 'no' branch (1010). The rendered and displayed timed text is synchronized to the omnidirectional video similar to closed captions, open captions or subtitles or a combination thereof.

Upon determining that the position of the timed text is dependent on the viewport, the process then identifies from the signaling message, parameters to adjust for a depth disparity of the timed text (1006). The process then renders the timed text for display relative to the viewport based on the identified parameters (1008). When rendering the timed text for display relative to the viewport, the process renders the timed text in a fixed location on a display that is independent of a viewing direction within omnidirectional video. Additionally, when rendering the timed text for display relative to the viewport, the process adjusting for the depth disparity of the timed text by shifting a location of the timed text on a left half of a display and the timed text on a right half of the display. For example, the timed text on the left half of the display is displaced left by the identified parameters while the timed text on right half of the display is displaced right by the identified parameters.

Upon determining that the position of the timed text is dependent on the viewport, the process then identifies from the signaling message, parameters to position of the timed text within the omnidirectional video (1010). The process then renders the timed text for display relative to the omnidirectional video based on the identified parameters (1012). When rendering the timed text for display relative to the omnidirectional video, the process renders the timed text in a fixed location within the omnidirectional video, viewing of which is dependent on a viewing direction of the HMD within the omnidirectional video itself. Additionally, when rendering the timed text for display relative to the omnidirectional video, the location of the timed text within the omnidirectional video is based on the identified parameters. For example, the parameters indicate that when rendering the timed text a spherical coordinate system is to be utilized where the center of the omnidirectional video is located at the center of a sphere. Thereafter a plane within the sphere, is generated. The plane is located a distance from the center of the sphere and the plane is oriented based on yaw, pitch and roll based on the parameters.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device for rendering timed text within an omnidirectional video, the electronic device comprising:
   a display configured to display a portion of the omnidirectional video that corresponds to a viewport;
   a transceiver configured to receive a signaling message including a flag indicating whether a position of the timed text within the omnidirectional video is relative to the viewport of the omnidirectional video; and
   a processor operably coupled to the transceiver, the processor configured to:
      determine whether the position of the timed text within the omnidirectional video is relative to the viewport based on the flag;
      render the timed text at a fixed location within the omnidirectional video based on the determination that the timed text is not relative to the viewport; and
      control the display to display the timed text when the viewport overlaps the fixed location within the omnidirectional video.

2. The electronic device of claim 1, wherein:
   in response to determining that the position of the timed text is relative to the viewport, the processor is configured to identify, from the signaling message, parameters to adjust for a depth disparity of the timed text; and
   to render the timed text within the omnidirectional video, the processor is configured to render the timed text for display relative to the viewport based on the identified parameters.

3. The electronic device of claim 2, wherein, to render the timed text for display relative to the viewport, the processor is configured to render the timed text in a fixed location on a display that is independent of a viewing direction within omnidirectional video.

4. The electronic device of claim 2, wherein:
   to render the timed text for display relative to the viewport, the processor is configured to adjust for the depth disparity of the timed text by shifting a location of the timed text on a left half of a display and the timed text on a right half of the display,
   the timed text on the left half of the display is displaced left by the identified parameters, and
   the timed text on the right half of the display is displaced right by the identified parameters.

5. The electronic device of claim 1, wherein:
   in response to determining that the position of the timed text is not relative to the viewport, the processor configured to identify, from the signaling message, parameters to position the timed text within the omnidirectional video; and
   to render the timed text relative to the omnidirectional video, the processor is configured to render the timed text for display relative to the omnidirectional video based on the identified parameters.

6. The electronic device of claim 5, wherein:
   to render the timed text for display within the omnidirectional video, the processor is configured to render the timed text in the fixed location within the omnidirectional video, viewing of which is dependent on a viewing direction within the omnidirectional video, and
   the fixed location within the omnidirectional video is based on the identified parameters.

7. The electronic device of claim 5, wherein:
   to render the timed text for display relative to the omnidirectional video, the processor is configured to utilize a spherical coordinate system where a center of the omnidirectional video is located at a center of a sphere;
   generate a plane within the sphere, that is located at a distance from the center of the sphere and the plane is oriented perpendicular to a predetermined yaw and pitch based on the identified parameters; and
   the processor is configured to render the timed text on a position on the plane that is oriented based on a roll and centered on the plane.

8. The electronic device of claim 1, wherein to render the timed text within the omnidirectional video, the processor is configured to display text that is synchronized to a timing of the omnidirectional video.

9. A server for supporting timed text within omnidirectional video, the server comprising:
   a processor configured to generate a signaling message including a flag indicating whether a position of the timed text to be rendered within the omnidirectional video is relative to a viewport of the omnidirectional video; and
   a communication interface operably coupled to the processor, the communication interface configured to transmit the signaling message to an electronic device to indicate whether the position of the timed text within the omnidirectional video is relative to the viewport for rendering of the timed text within the omnidirectional video and when the flag indicates that the position of the timed text to be rendered within the omnidirectional video is not relative to the viewport, the timed text is to be rendered at a fixed location within the omnidirectional video.

10. The server of claim 9, wherein when the signaling message includes the flag indicating that the position of the timed text is relative to the viewport, the processor is configured to generate parameters to adjust for a depth disparity of the timed text.

11. The server of claim 10, wherein:
the processor is configured to indicate in the signaling message that the timed text is in a fixed location within the viewport,
the fixed location is independent of a viewing direction within omnidirectional video.

12. The server of claim 9, wherein:
when the signaling message includes the flag indicating that the position of the timed text is not relative to the viewport, the processor is configured to generate parameters to position the timed text within the omnidirectional video, and
the position of the timed text relative to the omnidirectional video is fixed in the omnidirectional video.

13. A method for rendering timed text within omnidirectional video, the method comprising:
receiving a signaling message including a flag indicating whether a position of the timed text within the omnidirectional video is relative to a viewport of the omnidirectional video;
determining whether the position of the timed text within the omnidirectional video is relative to the viewport based on the flag;
rendering the timed text at a fixed location within the omnidirectional video based on the determination that the timed text is not relative to the viewport; and
displaying the timed text when the viewport overlaps the fixed location within the omnidirectional video.

14. The method of claim 13, further comprising:
in response to determining that the position of the timed text is relative to the viewport, identifying, from the signaling message, parameters to adjust for a depth disparity of the timed text,
wherein rendering the timed text within the omnidirectional video further comprises rendering the timed text for display relative to the viewport based on the identified parameters.

15. The method of claim 14, wherein rendering the timed text for display relative to the viewport further comprises rendering the timed text in a fixed location on a display that is independent of a viewing direction within omnidirectional video.

16. The method of claim 14, wherein:
rendering the timed text for display relative to the viewport comprises adjusting for the depth disparity of the timed text by shifting a location of the timed text on a left half of a display and the timed text on a right half of the display,
the timed text on the left half of the display is displaced left by the identified parameters, and
the timed text on the right half of the display is displaced right by the identified parameters.

17. The method of claim 13, wherein:
in response to determining that the position of the timed text is not relative to the viewport, identifying, from the signaling message, parameters to position the timed text within the omnidirectional video; and
rendering the timed text relative to the omnidirectional video comprises rendering the timed text for display relative to the omnidirectional video based on the identified parameters.

18. The method of claim 17, wherein:
rendering the timed text for display in the omnidirectional video comprises rendering the timed text in the fixed location within the omnidirectional video, viewing of which is dependent on a viewing direction within the omnidirectional video, and
the fixed location within the omnidirectional video is based on the identified parameters.

19. The method of claim 17, wherein rendering the timed text for display relative to the omnidirectional video comprises:
utilizing a spherical coordinate system where a center of the omnidirectional video is located at the center of a sphere;
generating a plane within the sphere, that is located at a distance from the center of the sphere and the plane is oriented perpendicular to a predetermined yaw and pitch based on the identified parameters; and
rendering the timed text on a position on the plane that is oriented based on a roll and centered on the plane.

20. The method of claim 13, wherein rendering the timed text within the omnidirectional video comprises displaying text that is synchronized to a timing of the omnidirectional video.

* * * * *